United States Patent [19]

Benson et al.

[11] Patent Number: 4,702,853

[45] Date of Patent: Oct. 27, 1987

[54] PHASE CHANGE THERMAL ENERGY STORAGE MATERIAL

[75] Inventors: David K. Benson, Golden; Richard W. Burrows, Conifer, both of Colo.

[73] Assignee: The United States of America as represented by the Department of Energy, Washington, D.C.

[21] Appl. No.: 915,842

[22] Filed: Oct. 6, 1986

[51] Int. Cl.[4] .............................................. C09K 5/06
[52] U.S. Cl. ...................................... 252/70; 165/10; 568/853
[58] Field of Search ........................... 252/70; 165/10; 568/853

[56] References Cited

U.S. PATENT DOCUMENTS 2,671,118  3/1954  Gangwer ............................ 568/853
4,572,864  2/1986  Benson et al. ........................ 252/70

OTHER PUBLICATIONS

Benson et al., "Solid State Phase Transitions in Pentaerythritol and Related Polyhydric Alcohols," Sol. Energy Mater. 1986, 13(2), 133–152, (CA 104:136988b).

*Primary Examiner*—Robert A. Wax
*Attorney, Agent, or Firm*—Kenneth L. Richardson; James W. Weinberger; Judson R. Hightower

[57] ABSTRACT

A thermal energy storge composition is disclosed. The composition comprises a non-chloride hydrate having a phase change transition temperature in the range of 70°–95° F. and a latent heat of transformation of at least about 35 calories/gram.

18 Claims, No Drawings

PHASE CHANGE THERMAL ENERGY STORAGE MATERIAL

The United States Government has rights in this invention under Contract No. DE-AC02-83CH10093 between the U.S. Department of Energy and the Solar Energy Research Institute, a Division of the Midwest Research Institute.

BACKGROUND OF THE INVENTION

1. Field of the Invention

The present invention relates generally to thermal energy storage materials and, more particularly, to phase change materials capable of storing large amounts of energy per unit of volume. Specifically, the present invention relates to a novel phase change thermal energy storage composition which has characteristics capable of efficient utilization in a variety of thermal energy storage environments as well as in certain medical applications.

2. Description of the Prior Art

Energy systems utilizing alternate fuel sources have been studied intensely in recent years. As a part of such studies research has been conducted toward processes and mechanisms designed to store thermal energy generated from a wide variety of sources. One particular area presently under investigation deals with the storage of thermal energy created by solar energy systems, and in particular increasing the efficiencies of such storage of thermal energy.

A wide variety of liquid and solid materials have been utilized to store thermal energy. Typically, water, glycol, oil and the like have been utilized as liquid media for transferring and/or storing thermal energy in certain solar energy systems. In addition, solid materials such as concrete, brick and the like have also been utilized in passive solar systems for storing thermal energy. One example of such is the Trombe wall wherein direct solar gain on one side thereof is stored and reradiated into living areas from the opposite side thereof. Such storage mediums, however, have been limited in their per unit volume capability of storing thermal energy as well as their capability of storage for prolonged periods to provide a delay time in energy delivery.

During the process of investigating candidate materials for thermal energy storage, it was discovered that phase change materials, both solid-solid as well as solid-liquid, have the capability of storing exceptionally large amounts of energy per unit volume at temperatures above their phase change temperature. Appropriate applications of such phase change materials are dependent on the actual transition temperature of the particular material. In buildings utilizing passive solar energy systems, thermal energy storage is needed to prevent over-heating during daylight hours and to prolong the delivery of solar heat into the night. Traditionally, massive materials of construction such as masonry, adobe, or water in storage tanks have been used to store solar heat. While these methods are effective and have been successfully used in many building applications, they do not fit well into the growing trend of light-weight and factory-built homes.

In energy conserving commercial buildings, there are opportunities for using thermal energy storage to reduce peak cooling power demands, to reduce chiller equipment size and cost, and to improve the efficiency of air conditioning system performance. Thermal energy storage materials may be used as a heat sink during the day to absorb internally generated heat and maintain comfort. At night, the stored heat is removed by forced air ventilation or the use of compression chillers operating at the lower ambient air reject temperature and at the lower off-peak utility rate. Phase change thermal energy storage materials would be highly useful for these and a variety of other purposes.

Phase change thermal energy storage materials have been utilized in a variety of energy system applications in the past. Crystalline polymers have been utilized as phase change materials for heat storage as disclosed in U.S. Pat. Nos. 4,063,546, 4,149,016 and 4,176,655. Mixtures of non-hydrated materials have also been used as phase change thermal energy materials such as disclosed in U.S. Pat. Nos. 4,309,297 and 4,470,917. Moreover, crystalline polymer compositions as well as halocarbon based materials typical of those used in refrigeration systems have also been used as thermal energy storage compositions. Examples disclosing such materials are illustrated in U.S. Pat. Nos. 4,182,398, 4,259,198, 4,473,484, 4,157,976, 4,455,247 and 4,468,337. Finally, the most efficient solid-liquid phase change thermal energy materials utilized to data include the halide salts such as disclosed in U.S. Pat. Nos. 3,958,101, 3,976,584, 4,081,256, 4,209,513, 4,273,667, 4,277,357 and 4,280,553. There are, however, distinct problems with such halide salts. They are corrosive and damaging to concrete and wood if container failure occurs, and containers must also be impervious to water vapor to prevent a change in composition and loss of the reversible phase transition. Moreover, these salts may be a health hazard if the container leaks. Some of these salts suffer from cyclic instability. Thus, there remains a need for a solid-liquid phase change thermal energy storage material which overcomes the aforementioned problems, is inexpensive to manufacture and is stable for long term usage.

SUMMARY OF THE INVENTION

Accordingly, it is one object of the present invention to provide an improved phase change thermal energy storage composition.

It is another object of the present invention to provide a thermal energy storage system utilizing an improved storage composition.

Another object of the present invention is to provide an improved heat generating pack.

Still another object of the present invention is to provide a phase change thermal energy storage composition which is non-corrosive, chemically inactive and relatively stable.

A further object of the present invention is to provide a thermal energy storage hydrate composition which has the capability of being supercooled to temperatures below the freezing temperature of water without losing much of its stored energy.

To achieve the foregoing and other objects and in accordance with the purpose of the present invention, a thermal energy storage composition is provided. The composition comprises of a non-chloride hydrate having a phase change transition temperature in the range of 70°–95° F. and a latent heat of transformation of greater than about 35 calorie/gram. A preferred form of the composition includes a composition of trimethylol ethane hydrate.

DETAILED DESCRIPTION OF THE PREFERRED EMBODIMENTS

Solid-liquid phase change materials (PCM) are crystalline materials which exhibit a large latent heat of transformation per unit mass when converting from a solid to a liquid state. Such phase change materials have been investigated and utilized in the past as described above. However, as previously indicated there have been numerous problems associated with the most efficient of such materials, that of halogen salt materials such as $Na_2SO_4 \cdot 10H_2O$, $CaCl_2 \cdot 6H_2O$, $MgCl_2 \cdot 6H_2O$ and the like.

A solid/liquid PCM of a non-chloride, hydrate-type material, however, has been discovered which has a high latent heat of transformation per unit mass at temperatures appropriate for use in thermal energy storage environments such as solar heated buildings and the like. A preferred temperature range for applications in building structures is in the range of approximately 70°-95° F. In addition, it has been found that the desired latent heat of transformation is preferably 50 calories/gram or greater, although PCM's having a latent heat of transformation in the range of 35 cal/g are quite useful in many applications.

A preferred non-chloride hydrate-type PCM is trimethylol ethane hydrate. It has been found that a trimethylol ethane (TME) hydrate has a melting temperature of about 80° F. and a latent heat of melting of 74 cal/g. It has been determined that the preferred composition of this compound is TME X $H_2O$ wherein X is in the range of 1-20 and preferably is 10.

It was further discovered that the above composition has a tendency to undercool, that is, it remains liquid in form below its normal solidification or freezing temperature, and it remains liquid for prolonged periods of time at room temperatures well below the 80° F. transition temperature. It was also discovered that chilling the subject composition in a refrigerator to near 32° F. still does not cause it to recrystallize and solidify. However, if the undercooled liquid is seeded or nucleated, it solidifies and immediately releases latent heat of crystallization. Such nucleation can be caused by introducing a crystallite of TME into the supercooled liquid. Recrystallization can also be initiated by chilling a small portion of the liquid composition to near dry ice temperatures, i.e. $-209.9°$ C. Thus, introducing ordinary ice to the supercooled liquid does not cause it to crystallize, but the introduction of a small piece of ice formed at very low temperatures, for example dry ice temperature, does cause the supercooled liquid to crystallize.

The high heat of melting at 80° F. of the preferred composition of the present invention functions well in passive solar energy storage applications. In some of such applications, the undercooling characteristics of the liquid present a slight difficult. In these instances, it is not desired to undercool below the transition temperature. To achieve this, it requires a design which insures that some of the PCM remains solid so as to initiate recrystallization upon cooling to and below 80° F.

It was also determined that the undercooling or supercooling capability of the TME hydrate composition has some very beneficial effects in a variety of environmental applications, such as in medical heat pack technology. For instance, intentional undercooling of the liquid PCM to room temperature results in the liquid retaining its stored energy without any special insulation. This undercooled liquid can be kept for long periods of time in this condition until the stored heat is required. Then, by triggering recrystallization of the undercooled liquid, the liquid yields up most of its 74 cal/g stored heat. If the undercooled PCM liquid is carried or disposed in a pouch like enclosure and triggered to release the stored heat, the pouch could be applied to tissue areas in the cases of hypothermia or mundane discomfort such as cold hands, feet, and the like, thereby warming the skin and tissue in a variety of situations. Moreover, this aspect of the present invention can also be utilized in solar applications where there is a requirement for longer term heat storage over night without requiring extra insulation on the storage tank as in present devices and situations.

The following Examples illustrate formulations of the composition of the present invention for use in a variety of applications.

EXAMPLE I

The composition of the trimethylol ethane hydrate was formulated by admixing 11.6 mg of trimethylol ethane (TME) with 7.42 mg of distilled water. This solution was thoroughly admixed so as to hydrate the TME. Other mixtures tested included 4.58 mg TME and 8.27 mg $H_2O$, 3.17 mg TME and 13.38 mg $H_2O$, 1.19 mg TME and 6.01 mg $H_2O$, 6.04 mg TME and 3.47 mg $H_2O$ and 11.09 mg TME and 2.03 mg $H_2O$.

The above composition was then tested to measure the thermal properties of the material which were determined to be similar in passive solar heat applications. Trombe walls may be prepared having one side thereof exposed to solar energy. In one instance, one Trombe wall includes the above composition of the invention disposed therein. The other Trombe wall is built utilizing concrete. Both walls are exposed to solar heat, and the effectiveness of the Trombe wall application is determined as a fraction of annual heating energy requirements of a building. It is determined from these two applications that the PCM of the present invention provides heat storage performances comparable or superior to concrete four times as thick. Thus, utilization of the present invention in a Trombe wall application requires one-tenth the mass of equivilant concrete. Other passive solar applications of the PCM of the present invention includes placing the TME hydrate composition within small known storage containers such as drums and the like, typical containers where water has previously been placed as the heat storage medium. The PCM is then exposed to temperatures substantially above its transition temperature so as to melt into a liquid form and thereby store substantial amounts of thermal energy therein. When the temperature of the environment surrounding the storage containers containing the TME hydrate drops below its 80° F. transition temperature, the TME hydrate begins to recrystallize and yield up its stored heat, thereby radiating heat into the building storage space during periods when there is no external solar energy. As previously indicated, in order to prevent the undercooling phenomenon in this kind of application, it must be assured that a small portion of TME hydrate remains in a solid state to thereby permit easy and rapid recrystallization when the temperature drops below 80° F.

EXAMPLE II

A storage container containing the TME composition of Example I is prepared. In this instance, however, it is desired to utilize the undercooling characteristics of the composition of the present invention. Thus, the container is exposed to sufficient solar or thermal energy so as to fully melt the contents thereof. In this particular application, it is desired to store solar energy through a prolonged cooling period such as night time or the like so to be able to generate heat at a later time. In this instance, a separate crystallite of TME is held aside so as to be introduced to the liquid within the storage container when it desired to release the stored heat. Thus, once the TME hydrate is fully melted so as to store the appropriate energy therewithin, the environment may continue to cool the stored liquid without affecting the amount of energy stored within the container. When it is desired to release the stored energy such as during a day time period when there is no thermal or solar energy available, a crystallite of TME is introduced to the storage container to commence recrystallization of the TME hydrate. Once this recrystallization process commences, the stored energy of 74 cal/g is released to the environment surrounding the container thereby providing heat as desired.

EXAMPLE III

As is previously indicated, a composition of the TME hydrate of the present invention may be placed within a sealed pouch of any desired size, for example four inches square. The pouch material may be any appropriate material selected from the market such as a polyester material nonreactive with the PCM of the present invention. Once the PCM composition is placed within the pouch, the pouch is tightly sealed along all sides thereof so as to produce an air-tight pouch containing the crystalline TME hydrate. This pouch is then heated to substantially above its 80° F. transition temperature, and the crystalline material is thereby melted so as to store heat therein. A separate breakable container is also disposed within the sealed pouch containing crystallites of TME. These TME crystallites are maintained in their crystalline form. One or more of these separate small containers may be disposed within the pouch.

Once the TME hydrate is melted, the pouch is then cooled to room temperature. The previously described undercooling capability of the composition of the present invention is such that the contents of the pouch remain liquid even at room temperature and below. When it is desired to generate spot heat such as in the case of hypothermia, frost bite or the like, the pouch is placed over the area desired to be heated, and one of the inner containers disposed within the pouch is then broken thereby introducing the crystallite TME to the liquid contents of the pouch. This introduction of the crystallite TME commences recrystallization which releases the stored energy from the pouch. This release of stored energy will continue so long as the recrystallization process continues. Once the majority if the liquid within the pouch has recrystallized, the majority of the stored heat will have been dissipated.

The above medical pouch could be constructed in either a one time disposable design containing only one internal container, or in reaseable fashion whereby several small containers carrying TME crystallites are disposed within the pouch for several applications or uses of the pouch. The present invention is not to be limited to the above-described construction. Other manners for constructing pouches containing the PCM composition of the present invention as well as for triggering recrystallization, such as electrical stimulation, are envisioned as being within the scope of the present invention.

As can be seen from the above, a phase change material having a high latent heat of transformation is provided by the present invention. This phase change material is capable of being placed within a wide variety of containers without corrosion problems as with prior phase change materials. Moreover, the solid/liquid phase change materials of the present invention have a transition temperature in a range which is highly desirable for structural heating applications, and in particular passive solar heating of building structures and the like. In addition, the phase change material of the present invention has a unique capability of undercooling or supercooling whereby the stored thermal energy may remain stored for extended periods of time without any external insulation or other means normally associated with retaining stored thermal energy over prolonged periods. Thus, the phase change material of the present invention may be stored in small packets or pouches and used in a variety of medical applications as described above, or it may be stored in large containers in the basements or substructure of residential or commercial buildings so as to provide heat as desired. Such storage occurs without having to construct expensive and bulky insulated thermal energy storage tanks as previously experienced in the prior art.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to within the scope of the invention as defined by the claims which follow.

The embodiments of the invention in which an exclusive property or privilege is claimed are defined as follows:

1. A thermal energy storage composition comprising a non-chloride hydrate having a phase change transition temperature in the range of 70°–95° F. and a latent heat of transformation of at least approximately 35 calories/gram.

2. The composition as claimed in claim 1, wherein said phase change transition temperature is in the range of 80°–85° F. and said latent heat of transformation is greater than about 50 calories/gram.

3. The composition as claimed in claim 1, wherein the liquedfied composition is capable of undercooling to below its freezing point.

4. The composition as claimed in claim 3, wherein said non-chloride hydrate liquid is capable of supercooling to at least 32° F.

5. The composition as claimed in claim 1, wherein said composition comprises a thermal storage fluid in a solar energy heating system.

6. A thermal energy storage tank comprising a containment vessel arranged for exposure to thermal energy, and a thermal energy storage composition disposed within said vessel and comprising a non-chloride hydrate having a phase change transition temperature in the range of 70°–95° F. and a latent heat of transformation of greater than about 35 calories/gram wherein said non-chloride hydrate comprises trimethyol ethane hydrate.

7. The storage tank as claimed in claim 6, wherein said composition comprises trimethylol ethane X $H_2O$, wherein X ranges from 1–20.

8. The storage tank as claimed in claim 7, wherein X is ten.

9. The storage tank as claimed in claim 6, wherein said composition comprises a eutectic composition trimethylol ethane hydrate.

10. The storage tank as claimed in claim 6, wherein said storage tank composes a passive solar tank.

11. The storage tank as claimed in claim 6, wherein said storage tank comprises a Trombe wall.

12. A heat generating pack comprising:
flexible, thin-film enclosure means;
a thermal energy storage composition disposed within said enclosure means, said composition comprising a non-chloride hydrate having a phase change transition temperature in the range of 70°–95° F., a latent heat of transformation of greater than about 35 calories/gram, and a capability of undercooling in liquid form below its freezing point so as to release thermal energy upon recrystallization thereof wherein said non-chloride hydrate comprises trimethylol ethane hydrate; and means for selectively recrystallizing said undercooled composition.

13. The heat generating pack as claimed in claim 12, wherein said composition comprises trimethylol ethane X $H_2O$, wherein ranges from 1–20.

14. The heat generating pack as claimed in claim 12, wherein said composition comprises a eutectic composition of trimethylol ethane hydrate.

15. The heat generating pack as claimed in claim 12, wherein said composition in liquid form is capable of supercooling to a temperature of at least 32° F.

16. The heat generating pack as claimed in claim 12, wherein said recrystallizing means comprises a crystal member selectively introduced to said undercooled composition to commence the recrystallization thereof.

17. The heat generating pack as claimed in claim 16, wherein said pack includes a plurality of separately compartmentallized crystal members adapted to permit reuse of said pack.

18. The heat generating pack as claimed in claim 17, wherein said composition comprises trimethylol ethane hydrate, and said crystal member comprises trimethylol ethane.

* * * * *